United States Patent
Okawa

(10) Patent No.: US 9,832,469 B2
(45) Date of Patent: Nov. 28, 2017

(54) CODING APPARATUS, CODING METHOD, AND STORAGE MEDIUM

(71) Applicant: CANON KABUSHIKI KAISHA, Tokyo (JP)

(72) Inventor: Koji Okawa, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 218 days.

(21) Appl. No.: 14/670,229

(22) Filed: Mar. 26, 2015

(65) Prior Publication Data

US 2015/0281693 A1    Oct. 1, 2015

(30) Foreign Application Priority Data

Mar. 28, 2014   (JP) ................................ 2014-069856

(51) Int. Cl.

| | |
|---|---|
| H04N 7/12 | (2006.01) |
| H04N 19/124 | (2014.01) |
| H04N 19/14 | (2014.01) |
| H04N 19/176 | (2014.01) |
| H04N 19/107 | (2014.01) |
| H04N 19/91 | (2014.01) |

(52) U.S. Cl.
CPC .......... *H04N 19/124* (2014.11); *H04N 19/14* (2014.11); *H04N 19/176* (2014.11); *H04N 19/107* (2014.11); *H04N 19/91* (2014.11)

(58) Field of Classification Search
CPC .................................................. H04N 19/124
See application file for complete search history.

(56) References Cited

U.S. PATENT DOCUMENTS

| | | | |
|---|---|---|---|
| 6,982,762 B1 | 1/2006 | Hui | |
| 2008/0304562 A1* | 12/2008 | Chang | H04N 19/159 375/240.03 |
| 2009/0086816 A1* | 4/2009 | Leontaris | H04N 19/154 375/240.03 |
| 2013/0077871 A1* | 3/2013 | Lu | G06K 9/36 382/197 |

(Continued)

OTHER PUBLICATIONS

ITU-T H.264 (Mar. 2010) Advanced video coding for generic audiovisual services, pp. 85-86 description about "slice type" and p. 97 description about "mb type".

(Continued)

*Primary Examiner* — Tracy Y Li
(74) *Attorney, Agent, or Firm* — Canon USA, Inc. I.P. Division

(57) ABSTRACT

In order to prevent such inconvenience that the effect of improving the image quality by allocating a large amount of code to an intra picture is lost in intra blocks included in an inter picture so that the image quality of the inter picture is deteriorated, a coding apparatus for coding an image on a block-by-block basis includes an acquisition unit configured to acquire a coding complexity of an intra picture and a coding complexity of an inter picture, the intra picture and the inter picture having been coded previous to the image, and a determination unit configured to determine a quantization parameter, which is used to code each block targeted for coding in the image, based on a picture type and a block type of the image and the coding complexities of the intra picture and the inter picture acquired by the acquisition unit.

14 Claims, 7 Drawing Sheets

(56) References Cited

U.S. PATENT DOCUMENTS

2015/0304672 A1* 10/2015 Takefumi ............ H04N 19/159
  375/240.12

OTHER PUBLICATIONS

ITU-T H.265 (Apr. 2013) High efficiency video coding, pp. p. 77 description about "slice type" and p. 87 description about "pred mode flag".

* cited by examiner

FIG. 5

| QD | α |
|---|---|
| 0 | 1.00 |
| 1 | 1.12 |
| 2 | 1.26 |
| 3 | 1.41 |
| 4 | 1.59 |
| 5 | 1.78 |
| 6 | 2.00 |

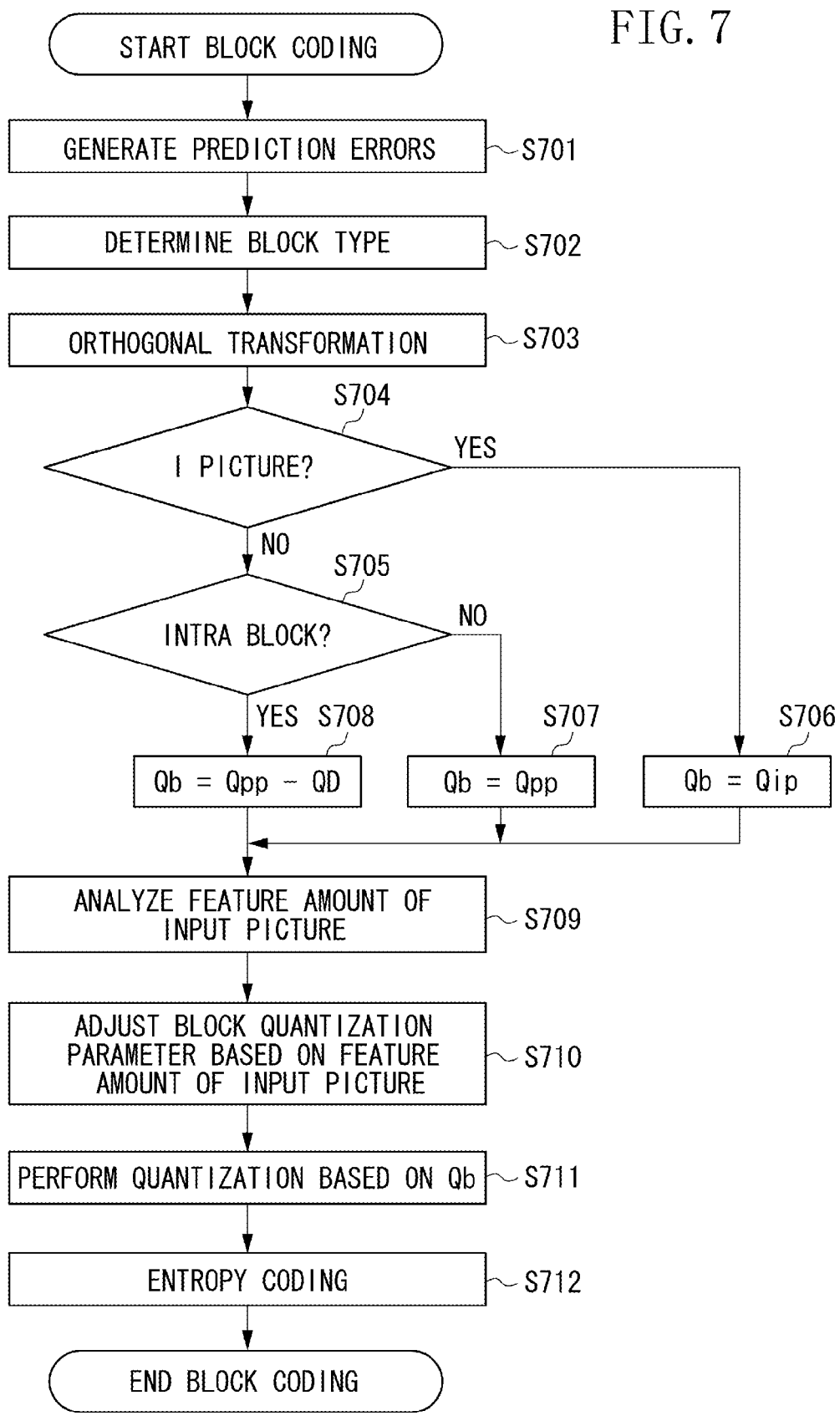

CODING APPARATUS, CODING METHOD, AND STORAGE MEDIUM

BACKGROUND OF THE INVENTION

Field of the Invention

The present invention relates to a coding apparatus, a coding method, and a storage medium, and, more particularly, to a technique adapted to be used to adaptively control a quantization parameter in a picture.

Description of the Related Art

Well-known coding methods used for compression recording of moving images include H.264/MPEG-4 AVC (hereinafter referred to as "H.264") (see Literature 1: ITU-T H.264 (March 2010) Advanced video coding for generic audiovisual services). Furthermore, there was developed a more high-efficient coding method serving as a successor to H.264, called H.265/High Efficiency Video Coding (hereinafter referred to as "HEVC") (see Literature 2: ITU-T H.265 (April 2013) High efficiency video coding).

H.264 and HEVC allow coding of pictures with picture types switched on a picture-by-picture basis. The picture types include an intra picture (hereinafter referred to as an "I picture"), in which coding is performed using only information contained in a picture, and an inter picture, in which coding is performed using information contained in another picture (hereinafter referred to as a "reference picture") in addition to information contained in the current picture.

The inter picture includes two picture types, i.e., a predicted picture (P picture), in which coding is performed using only information contained in a previous picture in reproduction order, and a bi-directional predicted picture (B picture), in which coding is performed additionally using information contained in a subsequent picture in reproduction order. In inter pictures, coding can be performed with block types adaptively switched on a block-by-block basis within each picture. The block types include an inter block, in which coding is performed using information contained in a reference picture, and an intra block, in which coding is performed using information contained in the current picture.

In inter pictures, coding can be performed using information contained in a reference picture, and, therefore, inter pictures are superior in data compression efficiency to I pictures.

On the other hand, in I pictures, coding is performed using only information contained in the current picture. Therefore, such random access processing can be performed that reproduction or editing and clipping of a moving image is started with not only the first picture but also an arbitrarily selected I picture.

Encoders generally perform coding while allocating the amount of code (code amount) to each picture depending on the above-mentioned picture types. Since, in an inter picture, coding is performed using a reference picture, improving the image quality of an I picture by allocating the more amount of code to the I picture enables also improving the image quality of a subsequent inter picture in which the I picture is used as a reference picture. With the image quality of the subsequent inter picture improved, the image quality of a further subsequent inter picture in which the former subsequent inter picture is used as a reference picture can be improved.

However, in the case of a moving image with a very quick movement, since a difference between a reference picture and a picture targeted for coding becomes large, improving the image quality of a subsequent picture by improving the image quality of an I picture has limited effectiveness. Nevertheless, if a very large amount of code is allocated to the I picture, since the amount of code to be allocated to a subsequent inter picture decreases, the image quality of the subsequent inter picture may be deteriorated.

Methods for solving the above-described issue include a method of calculating a picture complexity for each picture type and adaptively controlling the amount of code to be allocated to each picture according to the picture complexity (see Literature 3: U.S. Pat. No. 6,982,762). In the case of a video with little motion, since the complexity of an inter picture becomes relatively small as compared with that of an I picture, the large amount of code is allocated to the I picture.

However, the technique discussed in Literature 3 does not take into account the block types in each inter picture. Since the image quality of an inter block takes over from the image quality of a reference picture, the higher the image quality of the reference picture, the higher the image quality of the inter block becomes. On the other hand, an intra block, in which coding is performed using information contained in the current picture, does not take over from the image quality of a reference picture.

Therefore, although the effect of improving the image quality by allocating a large amount of code to an I picture is taken over to inter blocks in an inter picture, it is lost in intra blocks included in the inter picture, so that the image quality of the intra blocks may be deteriorated.

As the image quality of the intra blocks in the inter picture is deteriorated, the image quality of an inter picture in which the former inter picture with the image quality of intra blocks deteriorated is used as a reference picture may also be deteriorated.

SUMMARY OF THE INVENTION

The present invention is directed to preventing such inconvenience that the effect of improving the image quality by allocating a large amount of code to an intra picture is lost in intra blocks included in an inter picture so that the image quality of the inter picture is deteriorated.

According to an aspect of the present invention, a coding apparatus for coding an image on a block-by-block basis includes an acquisition unit configured to acquire a coding complexity of an intra picture and a coding complexity of an inter picture, the intra picture and the inter picture having been coded previous to the image, and a determination unit configured to determine a quantization parameter, which is used to code each block targeted for coding in the image, based on a picture type and a block type of the image and the coding complexities of the intra picture and the inter picture acquired by the acquisition unit.

According to an exemplary embodiment of the present invention, since the amount of code to be allocated to an intra block included in an inter picture is adaptively controlled, the effect of improving the image quality by coding an intra block at a high image quality and allocating a large amount of code to an intra picture can be continued.

Further features of the present invention will become apparent from the following description of exemplary embodiments with reference to the attached drawings.

BRIEF DESCRIPTION OF THE DRAWINGS

FIG. 5 is a table illustrating a relationship between a quantization adjustment value QD and a code amount adjustment coefficient α.

FIG. 7 is a flowchart illustrating a procedure for block coding according to the second exemplary embodiment.

DESCRIPTION OF THE EMBODIMENTS

Various exemplary embodiments, features, and aspects of the invention will be described in detail below with reference to the drawings. The configurations described in the following exemplary embodiments are just examples and, therefore, not restrictive. Furthermore, in the following exemplary embodiments, an example is described in which coding is performed using H.264 (H.264/MPEG-4 AVC) with a block size of 16 horizontal pixels by 16 vertical pixels used. However, each exemplary embodiment is not restricted to the case using H.264. For example, each exemplary embodiment can also be easily applied to a case where coding is performed using HEVC (H.265/High Efficiency Video Coding method), in which a block size of up to 64 horizontal pixels by 64 vertical pixels can be used.

Figure 1:
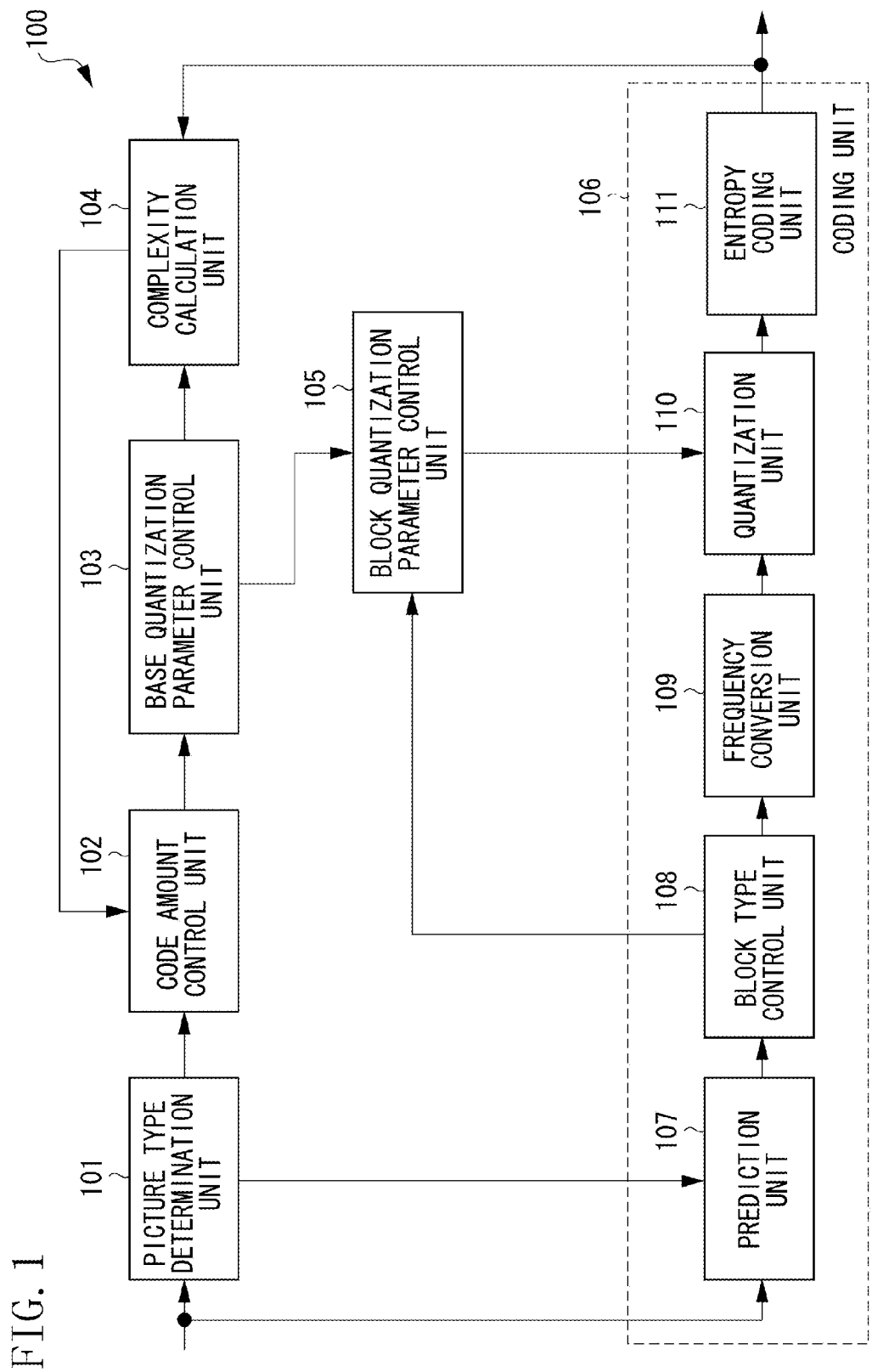
FIG. 1 is a block diagram illustrating a configuration example of a coding apparatus according to a first exemplary embodiment.

A first exemplary embodiment is described below with reference to FIGS. 1 to 5. FIG. 1 is a block diagram illustrating a configuration example of a coding apparatus 100 according to the first exemplary embodiment. Referring to FIG. 1, a picture type determination unit 101 determines the picture type (an intra picture or an inter picture) of a picture input to the coding apparatus 100.

A code amount control unit 102 determines a target amount of code (target code amount) of the input picture. The code amount control unit 102 determines the target code amount of a picture based on coding complexities of the respective picture types calculated by a complexity calculation unit 104 (to be described below) and the determined picture type. The code amount control unit 102, when controlling the target code amount according to the picture type, controls the target code amount in such a way as to keep the bit rate in a constant period constant.

A base quantization parameter control unit 103 receives the target code amount of the picture from the code amount control unit 102, and determines a quantization parameter serving as a reference of the picture (hereinafter referred to as a "base quantization parameter"). The complexity calculation unit 104 receives the base quantization parameter from the base quantization parameter control unit 103 and receives a code amount of the picture from an entropy coding unit 111 (to be described below), and calculates a coding complexity of each picture type.

A block quantization parameter control unit 105 receives the base quantization parameter from the base quantization parameter control unit 103 and receives a block type of a block targeted for processing (a processing target block) from a block type control unit 108 (to be described below), and determines a block quantization parameter for the processing target block. Hereinafter, the quantization parameter for the processing target block is referred to as a "block quantization parameter".

A coding unit 106, which is indicated with the broken line in FIG. 1, codes the input picture on a block-by-block basis. In the coding unit 106, a prediction unit 107 generates a prediction error by implementing prediction using pixels surrounding the processing target block (intra prediction) and motion compensation referring to another picture (inter prediction).

The block type control unit 108 receives the prediction error in intra prediction or inter prediction from the prediction unit 107, and determines which block type of the intra block and the inter block is to be used to code the processing target block. In a case where the input picture is an intra picture, all of the blocks contained in the picture are intra blocks. Thus, in a case where the input picture is an intra picture, the block type control unit 108 does not perform processing. Furthermore, the intra block includes intra slices and the inter picture includes inter slices. Accordingly, the block type control unit 108 may determine whether which slice time of the intra slice and the inter slice is to be used to code a slice targeted for processing.

A frequency conversion unit 109 converts the prediction error into a frequency-converted coefficient according to the block type determined by the block type control unit 108. A quantization unit 110 quantizes the frequency-converted coefficient generated by the frequency conversion unit 109 according to the block quantization parameter determined by the block quantization parameter control unit 105, and generates a quantized coefficient.

The entropy coding unit 111 performs variable length coding on the quantized coefficient generated by the quantization unit 110, and generates a coded stream. Examples of methods for variable length coding include Context-based Adaptive Variable Length Coding (CAVLC) and Context-based Adaptive Binary Arithmetic Coding (CABAC).

An operation of the coding apparatus 100 according to the first exemplary embodiment is described in detail with reference to the flowchart of FIG. 2. In the present exemplary embodiment, moving image data is input on a picture-by-picture basis and is then divided into blocks and processed in raster order by the coding unit 106.

In the present exemplary embodiment, the size of each block is 16 pixels by 16 pixels, which is the same as the block size in H.264. However, this block size is not restrictive. For example, the block size may be 64 pixels by 64 pixels, which is the maximum block size used in HEVC, 8 pixels by 8 pixels, or 32 pixels by 32 pixels, or may be asymmetric such as 32 pixels by 16 pixels. In the present exemplary embodiment, the coding unit 106 generates a stream conforming to H.264. However, this is not restrictive. For example, the coding unit 106 may generate a stream conforming to HEVC.

Figure 2:
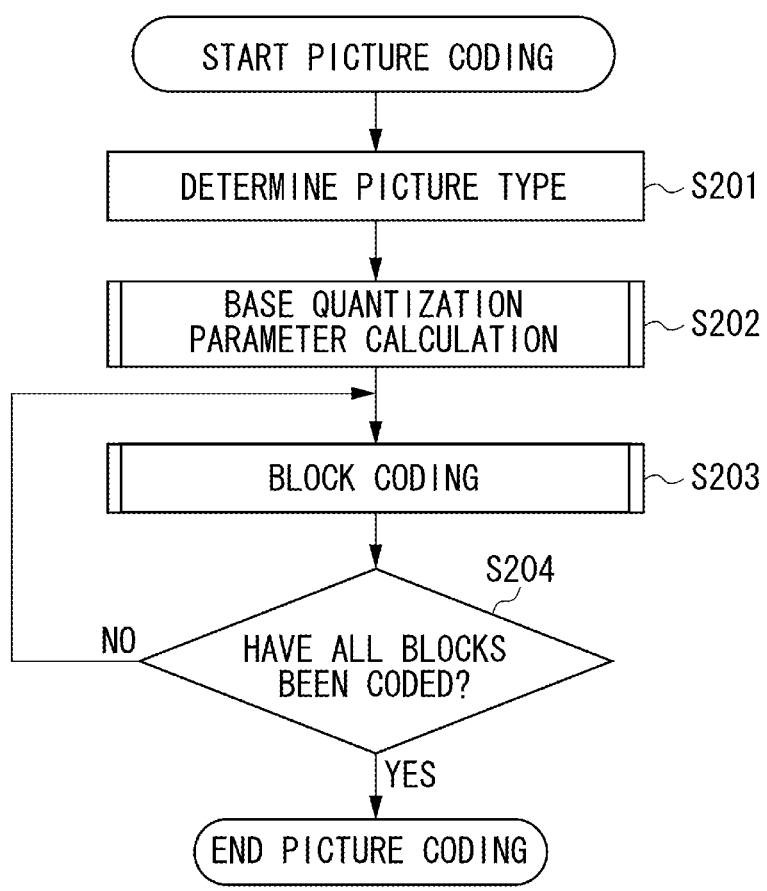
FIG. 2 is flowchart illustrating picture coding according to the first exemplary embodiment.

Referring to the flowchart of FIG. 2, first, in step S201, the picture type determination unit 101 determines a picture type of the input picture. In the present exemplary embodiment, suppose that the picture type determination unit 101 determines that the first picture in the moving image data is an intra picture (I picture), every fifteenth picture after the first picture is an I picture, and all of the remaining pictures are predicted pictures (P pictures) for coding. However, this is not restrictive. For example, the interval of I pictures may be other than 15 pictures, or bi-directional predicted pictures (B pictures) may be joined in addition to P pictures.

Next, in step S202, the coding apparatus 100 calculates base quantization parameters. The method for calculating base quantization parameters is described in detail with reference to the flowchart of FIG. 3.

Figure 3:
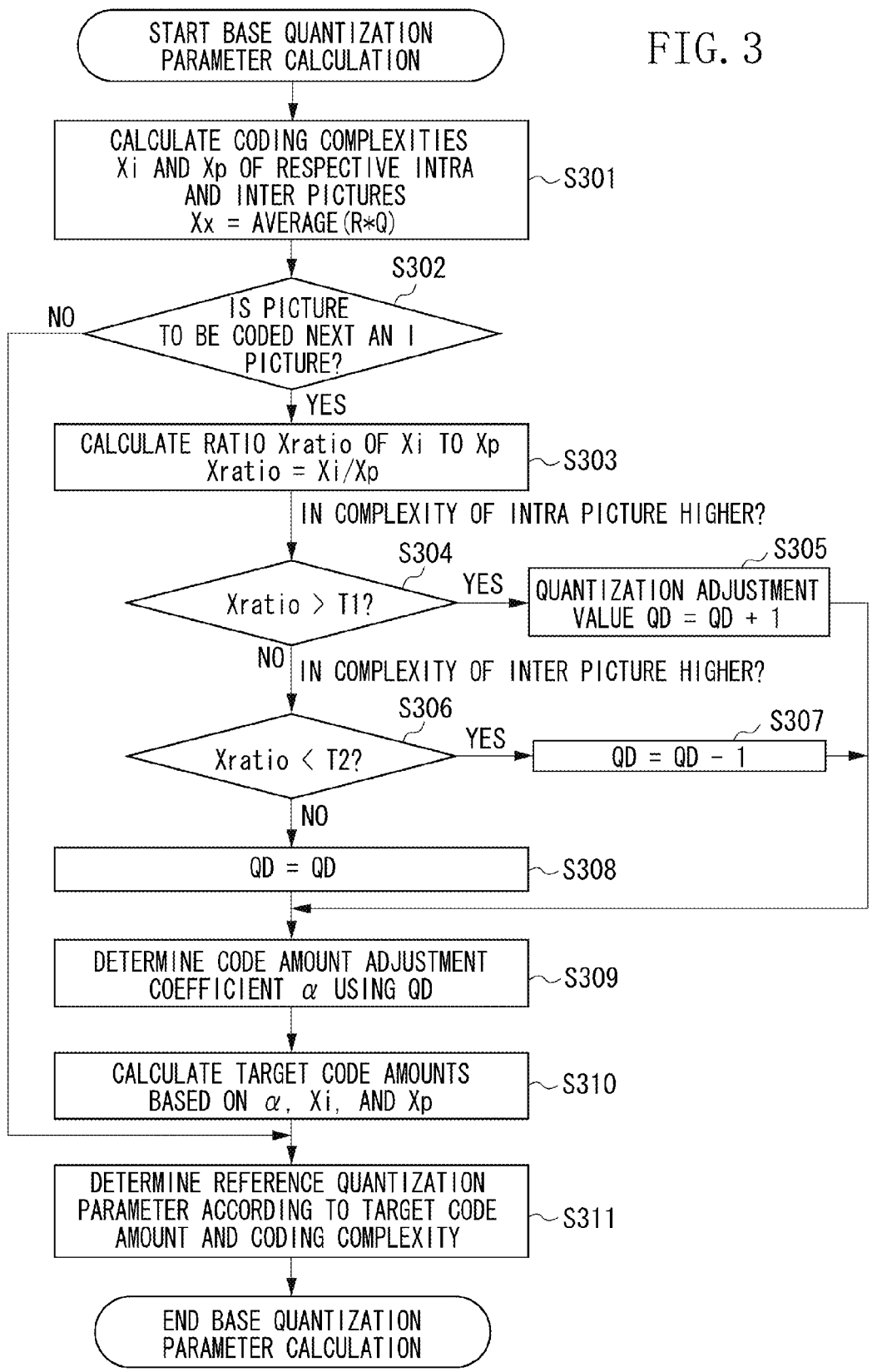
FIG. 3 is a flowchart illustrating a procedure for base quantization parameter calculation according to the first exemplary embodiment.

Referring to the flowchart of FIG. 3, processing in step S301 is performed by the complexity calculation unit 104, target code amount determination processing in steps S302 to S310 is performed by the code amount control unit 102, and processing in step S311 is performed by the base quantization parameter control unit 103. In step S301, the complexity calculation unit 104 calculates a coding complexity for each picture type by obtaining the average value of coding complexities of individual pictures that have been previously coded. Here, suppose that the coding complexity of a picture the picture type of which is an I picture is Xi, and the coding complexity of a picture the picture type of which is a P picture is Xp.

In the present exemplary embodiment, the complexity calculation unit 104 calculates coding complexities of individual pictures by multiplying a code amount R obtained as a result of actually coding each picture (hereinafter referred to as an "actual code amount") by a reference quantization step Q used for the picture. Here, the reference quantization step means a quantization step corresponding to the base quantization parameter. Suppose that the relationship between a quantization parameter and a quantization step conforms to a relationship defined in H.264. The actual code amount R and the reference quantization step Q are obtained from the outputs of the entropy coding unit 111 and the base quantization parameter control unit 103, respectively.

Next, the complexity calculation unit 104 calculates the average value of coding complexities of a plurality of previous pictures for each picture type, and sets the calculated average value as a coding complexity for each picture type. In the present exemplary embodiment, the complexity calculation unit 104 sets the average value of coding complexities of two previous pictures for I pictures and the average value of coding complexities of five previous pictures for P pictures as the coding complexities of the respective picture types.

In the present exemplary embodiment, the complexity calculation unit 104 calculates coding complexities of individual pictures using the actual code amount and the reference quantization step of each picture. However, this is not restrictive. For example, the complexity calculation unit 104 may calculate those using a block quantization parameter (to be described below) or a block quantization step corresponding to the block quantization parameter, instead of using the reference quantization step. Alternatively, the complexity calculation unit 104 may calculate the coding complexities using indexes, such as the variances of the input picture or a value obtained by converting, into absolute values, pixel differences obtained by the prediction unit 107 and summing the absolute values (the sum of absolute differences (hereinafter referred to as an "SAD")).

Furthermore, in the present exemplary embodiment, the coding complexity for each picture type is calculated as the average value of a plurality of previous pictures. However, this is not restrictive. Any value calculated based on the coding complexities of previously coded pictures can be used. For example, a median value of coding complexities of previously coded pictures may be used, or a coding complexity of the picture coded immediately before or a predetermined number of pictures before the current picture may be directly used as the coding complexity of the associated picture type.

Next, in step S302, the code amount control unit 102 determines whether the picture to be coded next is an I picture. If the code amount control unit 102 determines that the picture to be coded next is an I picture (YES in step S302), the processing proceeds to step S303. If the code amount control unit 102 determines that the picture to be coded next is not an I picture (NO in step S302), the processing proceeds to step S311. In step S303, the code amount control unit 102 calculates the ratio Xratio of the coding complexity Xi of the I picture to the coding complexity Xp of the P picture.

In step S304, the code amount control unit 102 compares the ratio Xratio in coding complexity with a threshold value T1. This comparison is made to determine whether the coding complexity of the I picture is relatively (the threshold value T1 or more) higher than the coding complexity of the P picture. If the code amount control unit 102 determines that the ratio Xratio in coding complexity is larger than the threshold value T1 (the coding complexity of the I picture is relatively higher than that of the P picture) (YES in step S304), the processing proceeds to step S305. Otherwise (NO in step S304), the processing proceeds to step S306.

In step S305, the code amount control unit 102 adds "1" to a quantization adjustment value QD. The quantization adjustment value QD is a variable indicating the magnitude of a difference in base quantization parameter between an I picture and a P picture. The allocation of code amounts is calculated in such a way that the base quantization parameter of an I picture and the base quantization parameter of a P picture immediately following the I picture satisfy the following relationship based on a given quantization adjustment value QD in step S310, which is described below.

Base quantization parameter of $P$ picture=Base quantization parameter of $I$ picture+Quantization adjustment value $QD$ This means that as the quantization adjustment value QD becomes larger, the base quantization parameter of an I picture becomes relatively smaller, so that a more code amount is allocated to the I picture. The coding complexity of an I picture being relatively higher than that of a P picture indicates that the motion prediction in the P picture is likely to come true (the prediction error in inter prediction is small). Therefore, allocating a more code amount to an I picture to improve the image quality thereof enables also improving the image quality of a P picture following the I picture. While, in the present exemplary embodiment, "1" is added to the quantization adjustment value QD, this is not restrictive. For example, an integer of "2" or more may be added to the quantization adjustment value QD.

In step S306, the code amount control unit 102 compares the ratio Xratio in coding complexity with a threshold value T2. This comparison is made to determine whether the coding complexity of the P picture is relatively higher than the coding complexity of the I picture. If the code amount control unit 102 determines that the ratio Xratio in coding complexity is smaller than the threshold value T2 (the coding complexity of the P picture is relatively higher than that of the I picture) (YES in step S306), the processing proceeds to step S307. Otherwise (NO in step S306), the processing proceeds to step S308.

In step S307, the code amount control unit 102 subtracts "1" from the quantization adjustment value QD. The coding complexity of a P picture being relatively higher than that of an I picture indicates that the motion prediction in the P picture is unlikely to come true (the prediction error in inter prediction is large). Therefore, even if the code amount of an I picture is increased to improve the image quality thereof, the effect of the improvement in image quality does not continue in a P picture following the I picture.

Since the bit rate in a constant period is constant, if a much code amount is allocated to an I picture, the code amount of a P picture is decreased by just that much, thus causing a deterioration in the image quality of the P picture. In order to prevent the image quality deterioration of a P picture, when the coding complexity of the P picture is high, the code amount control unit 102 decreases the quantization adjustment value QD to increase the code amount to be allocated to the P picture. While, in the present exemplary embodiment, "1" is subtracted from the quantization adjustment value QD, this is not restrictive. For example, an integer of "2" or more may be subtracted from the quantization adjustment value QD.

In step S308, the code amount control unit 102 does not update the quantization adjustment value QD. This means that the code amount control unit 102 does not change the relationship in base quantization parameter between the I picture and the P picture.

Figure 5:
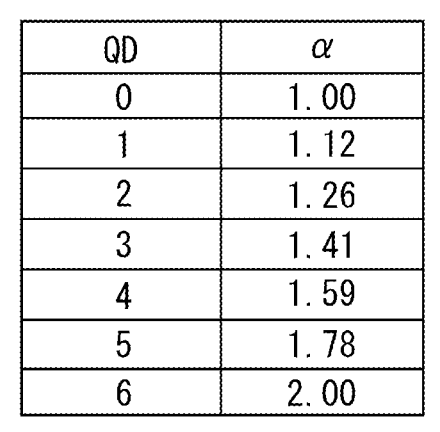

Next, in step S309, the code amount control unit 102 determines a code amount adjustment coefficient α based on a table illustrated in FIG. 5 using the quantization adjustment value QD. The relationship between the quantization adjustment value QD and the code amount adjustment coefficient α is the same as the relationship between a quantization parameter and a quantization step in the H.264 standard. The code amount adjustment coefficient α is used to calculate target code amounts in step S310, which is described below.

Next, in step S310, the code amount control unit 102 calculates a target code amount Ti of the I picture and a target code amount Tp of the P picture based on the code amount adjustment coefficient α and the coding complexities Xi and Xp according to the following formulae (1) and (2):

$$Ti=(Ta \times \alpha \times Xi)/(Xi+14 \times Xp) \quad (1)$$

$$Tp=(Ta-Ti)/14 \quad (2)$$

Here, Ta denotes a sum of target code amounts that are allocated to 15 pictures, including one I picture and 14 P pictures. As the code amount adjustment coefficient α becomes larger (as the quantization adjustment value QD becomes larger), the target code amount of an I picture becomes larger, and, conversely, the target code amount of a P picture becomes smaller.

Next, in step S311, the base quantization parameter control unit 103 determines a base quantization parameter for each picture. First, the base quantization parameter control unit 103 calculates a quantization step Qi of the I picture and a quantization step Qp of the P picture according to the following formulae (3) and (4):

$$Qi=Xi/Ti \quad (3)$$

$$Qp=Xp/Tp \quad (4)$$

After calculating the reference quantization steps, the base quantization parameter control unit 103 determines, as base quantization parameters, quantization parameters corresponding to the calculated reference quantization steps. Then, the coding apparatus 100 ends the base quantization parameter determination processing.

Figure 4:
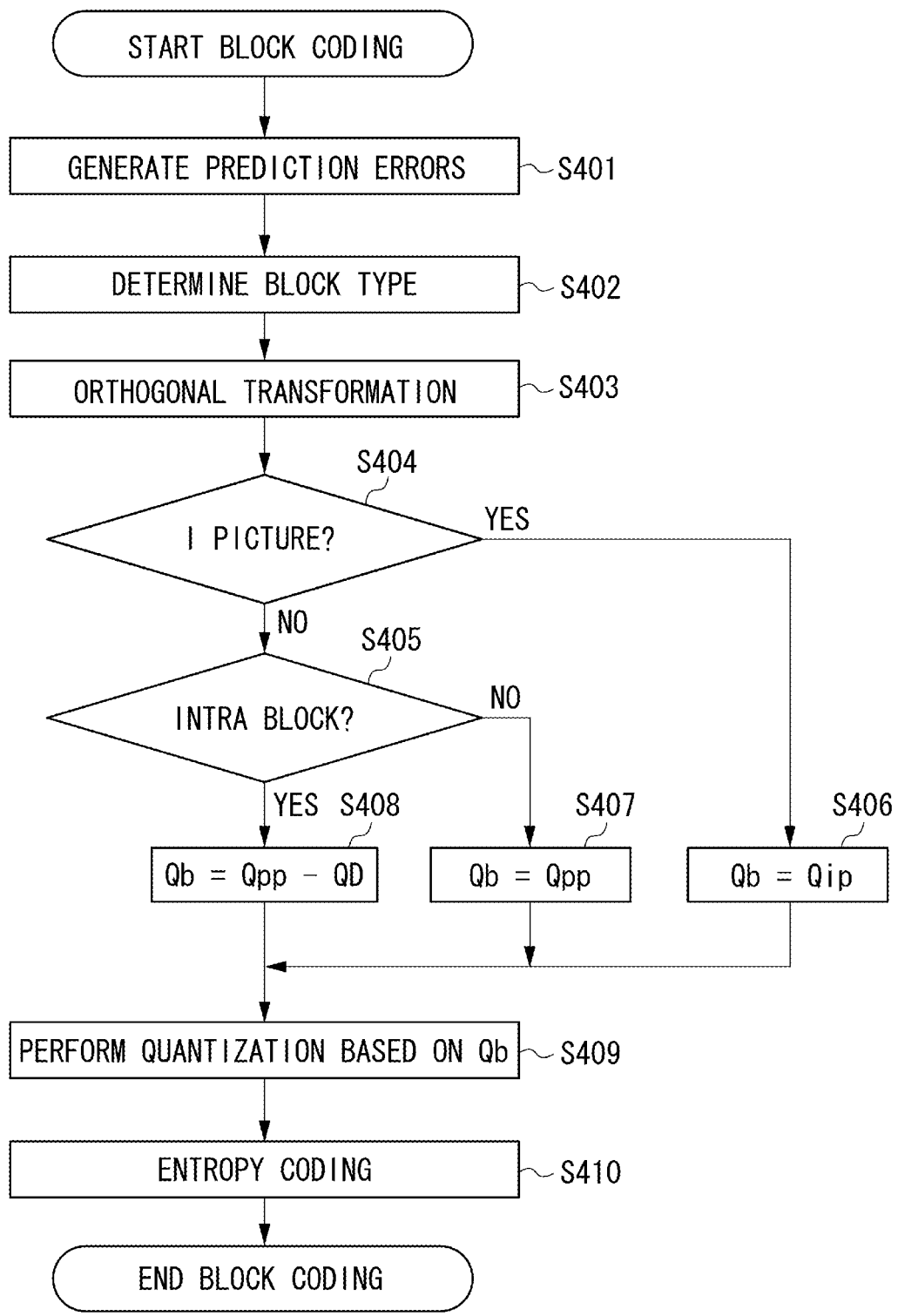
FIG. 4 is a flowchart illustrating a procedure for block coding according to the first exemplary embodiment.

Referring back to the flowchart of FIG. 2, block coding processing in step S203 is described in detail with reference to the flowchart of FIG. 4. Referring to the flowchart of FIG. 4, processing in step S401 is performed by the prediction unit 107, processing in step S402 is performed by the block type control unit 108, and processing in step S403 is performed by the frequency conversion unit 109.

Processing in steps S404 to S408 is performed by the block quantization parameter control unit 105. The block quantization parameter control unit 105 determines a block quantization parameter of an intra block included in an inter picture based on a block quantization parameter of a block included in an intra picture. More specifically, the block quantization parameter control unit 105 determines a block quantization parameter in such a way that the block quantization parameter in the intra picture and the block quantization parameter of an intra block included in the inter picture become almost equal to each other. Furthermore, processing in step S409 is performed by the quantization unit 110, and processing in step S410 is performed by the entropy coding unit 111.

First, in step S401, the prediction unit 107 performs, on an input image block, intra prediction, which uses pixels surrounding the block, or inter prediction, which uses a reference picture, and generates an intra prediction error and an inter prediction error.

Next, in step S402, the block type control unit 108 determines a block type based on the intra prediction error and the inter prediction error. In the present exemplary embodiment, the block type control unit 108 calculates an SAD of prediction errors and selects a block type from which a smaller SAD is obtained. While, in the present exemplary embodiment, the block type is determined using an SAD, this is not restrictive. For example, the block type may be determined in consideration of the number of bits of motion vectors or may be determined using a rate-distortion (R-D) optimization method.

Next, in step S403, the frequency conversion unit 109 performs orthogonal transformation on the above-mentioned prediction errors based on the determined block type and generates converted coefficients.

Next, in step S404, the block quantization parameter control unit 105 determines whether the picture to be processed is an I picture. If the block quantization parameter control unit 105 determines that the picture to be processed is an I picture (YES in step S404), the processing proceeds to step S406. Otherwise (NO in step S404), the processing proceeds to step S405.

In step S405, the block quantization parameter control unit 105 determines whether the block to be processed is an intra block based on information on the block type received from the block type control unit 108. If the block quantization parameter control unit 105 determines that the block to be processed is an intra block (YES in step S405), the processing proceeds to step S408. Otherwise (NO in step S405), the processing proceeds to step S407.

In step S406 (in a case where the picture to be processed is an I picture), the block quantization parameter control unit 105 sets, as a block quantization parameter Qb, a value Qip, which is a base quantization parameter of the I picture to be processed.

In step S407 (in a case where the picture to be processed is a P picture and the block to be processed is an inter block), the block quantization parameter control unit 105 sets, as the block quantization parameter Qb, a value Qpp, which is a base quantization parameter of the P picture to be processed.

In step S408 (in a case where the picture to be processed is a P picture and the block to be processed is an intra block), the block quantization parameter control unit 105 sets, as the block quantization parameter Qb, a value obtained by subtracting the above-mentioned quantization adjustment value QD from the value Qpp. The quantization adjustment value QD is a variable indicating a difference in quantization parameter between an I picture and a P picture immediately following the I picture.

Subtracting the quantization adjustment value QD from the value Qpp enables also applying the relationship in image quality difference between an I picture and a P picture, which has been set at the time of allocating target code amounts of the I picture and the P picture, to intra blocks and inter blocks included in the P picture. In other words, when a much code amount is allocated to an I picture in order to obtain the effect of realizing a high image quality of a P picture following the I picture, that effect can be prevented from being lost in intra blocks included in the P picture, so that the entire image can be made to have a high image quality.

Furthermore, with regard to an image in which the coding complexity of the P picture is high and many prediction errors occur during inter prediction, the quantization adjustment value QD becomes small. This can prevent the image degradation of an inter block occurring when a much code amount is allocated to an intra block included in the P picture. While, in the present exemplary embodiment, a value "Qpp–QD" is set to the block quantization parameter of an intra block included in the inter picture, this is not restrictive. For example, a value Qip, which is the base quantization parameter of the I picture, may be directly set to the block quantization parameter.

Next, in step S409, the quantization unit 110 quantizes the converted coefficient, which has been generated in step S403, based on the block quantization parameter Qb, and generates a quantized coefficient. In step S410, the entropy coding unit 111 performs entropy coding on the quantized coefficient, and generates a coded stream conforming to H.264. While, in the present exemplary embodiment, the format of a coded stream to be generated is H.264, this is not restrictive. For example, a coded stream conforming to HEVC may be generated.

Referring back to the flowchart of FIG. 2, in step S204, the coding apparatus 100 determines whether all of the blocks included in the picture have been coded. If the coding apparatus 100 determines that not all of the blocks have been coded (NO in step S204), the processing returns to step S203, in which the coding apparatus 100 performs block coding on a subsequent block. If the coding apparatus 100 determines that all of the blocks have been coded (YES in step S204), the coding apparatus 100 ends the picture coding processing.

With the above-described configuration and operation, after target code amounts are adaptively set according to the coding complexities of the I picture and the P picture, the code amount of an intra block included in the P picture can also be adaptively controlled according to the coding complexities. Then, this can prevent the effect of improving the image quality of the P picture from being lost in intra blocks included in the P picture with regard to an image in which the inter prediction is likely to come true.

Furthermore, with regard to an image in which only small prediction errors occur, an unnecessary code amount can be prevented from being allocated to intra blocks.

In addition, while, in the above-described exemplary embodiment, the target code amount is controlled in such a way as to keep the bit rate in a constant period constant, this is not restrictive. For example, even when the bit rate in a constant period is variable, a similar effect can be attained by applying the base quantization parameter of the I picture to intra blocks included in the P picture.

Figure 6:
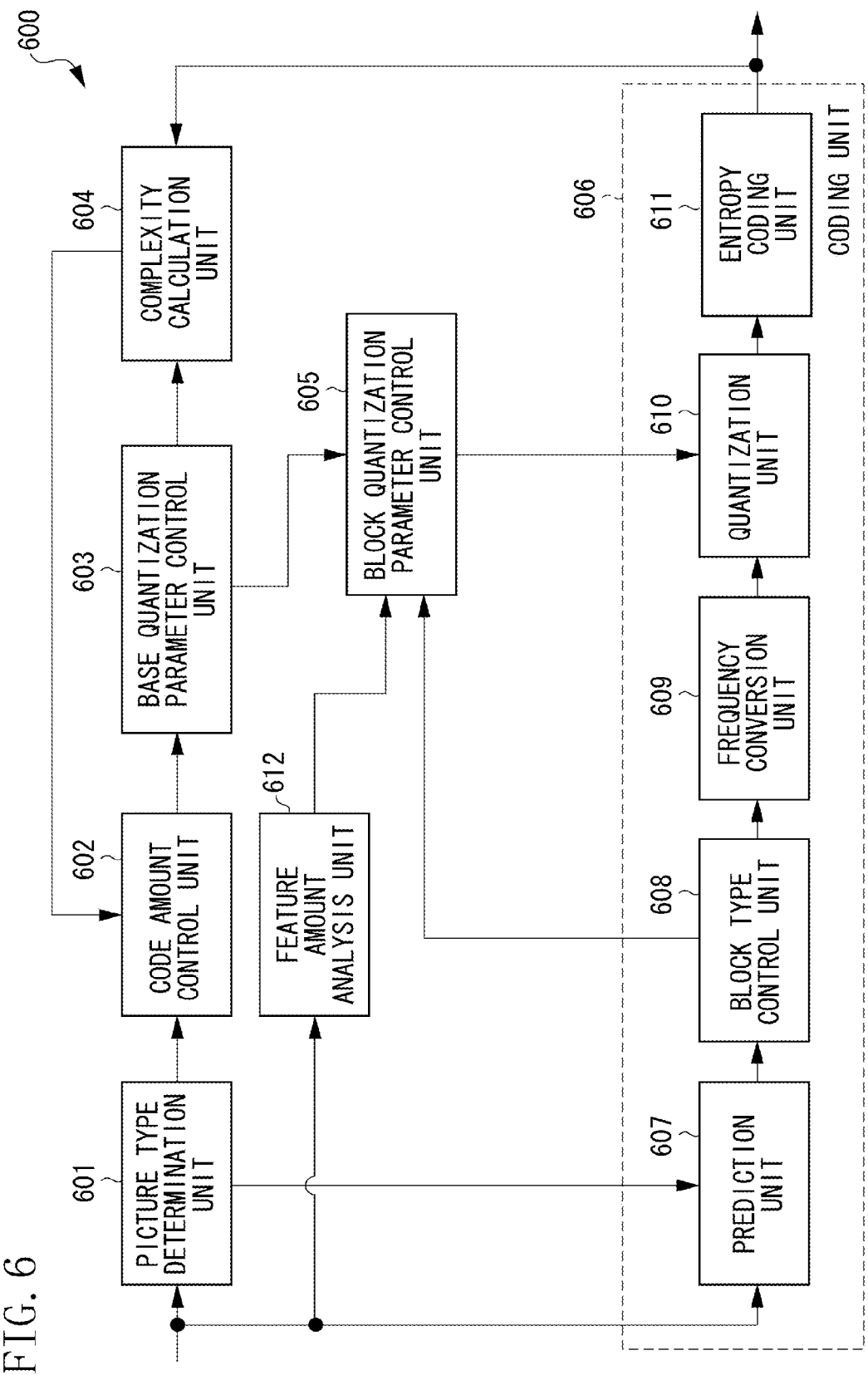
FIG. 6 is a block diagram illustrating a configuration example of a coding apparatus according to a second exemplary embodiment.

A second exemplary embodiment is described below with reference to FIGS. 6 and 7. FIG. 6 is a block diagram illustrating a configuration example of a coding apparatus 600 according to the second exemplary embodiment. Units 601 to 604 and units 606 to 611 illustrated in FIG. 6 are similar in configuration to the units 101 to 104 and the units 106 to 111 illustrated in FIG. 1, and are, therefore, omitted from the description.

Referring to FIG. 6, a block quantization parameter control unit 605 receives a feature amount of the input picture from a feature amount analysis unit 612, which is described below, in addition to the base quantization parameter and the block type which the block quantization parameter control unit 105 illustrated in FIG. 1 receives, and corrects (determines) a block quantization parameter based on the received feature amount, base quantization parameter, and block type. The feature amount analysis unit 612 analyzes a feature amount of the input picture.

An operation of the second exemplary embodiment is described with reference to the flowchart of FIG. 2. The operation of the second exemplary embodiment is similar to the operation of the first exemplary embodiment except for the block coding processing performed in step S203 illustrated in FIG. 2, and is, therefore, omitted from the description.

Referring to FIG. 2, the block coding processing performed in step S203 according to the second exemplary embodiment is described in detail with reference to the flowchart of FIG. 7. Steps S701 to S708 and steps S711 and S712 illustrated in FIG. 7 are similar in processing operation to the steps S401 to S408 and the steps S409 and S410 illustrated in FIG. 4, and are, therefore, omitted from the description.

In step S709, the feature amount analysis unit 612 analyzes, as a feature amount, a complexity (activity) of luminance and/or an average value of luminance of the input block. Since these indices have a close correlation with human visual characteristics, those are used to correct the block quantization parameter in subsequent step S710. A method for calculating the activity in the present exemplary embodiment is specifically described below.

First, the feature amount analysis unit 612 divides a block into a plurality of sub-blocks each having a size of 4×4 pixels, and calculates, as the activity of a sub-block, the sum of magnitudes (absolute values) of differences between luminance of pixels belonging to the sub-block and the average value of luminance of the sub-block. After calculating the activities of all of the sub-blocks included in the block, the feature amount analysis unit 612 calculates the smallest activity as the activity of the block. However, the feature amount is not restricted to the activity and the average value of luminance. Any feature amount based on which the degree of influence on the human visual sense can be determined and any feature amount that can be determined based on the human visual characteristics may be used.

For example, the feature amount analysis unit 612 may calculate variance of luminance or average value, activity, or variance of chrominance, or may use, as indices, motion vectors or a coding result of prediction errors. While the smallest value of activity in the sub-blocks each having a size of 4×4 pixels is used to calculate the activity, sub-blocks each having a size of 8×8 pixels or sub-blocks each having a size of 16×16 pixels may be directly used, or the average value or the largest value may be used instead of the smallest value. Furthermore, the number of types of block evaluation values to be calculated is not restricted to two. For example, another type of feature amount, such as average value of chrominance, may be calculated in addition to the average value of luminance and the activity.

Next, in step S710, the block quantization parameter control unit 605 corrects (adjusts) the block quantization parameter based on the feature amount. In the present exemplary embodiment, the block quantization parameter control unit 605 classifies blocks into classes based on the activity and the average value of luminance of each block. Then, a correction value for the quantization parameter is previously determined with respect to each class, and the correction value is applied to blocks belonging to each class. The correction value is simply added to the block quantization parameter Qb calculated in steps S706 to S708.

For example, in a case where the correction value for the class to which a block belongs is +3, "Qb=Qpp−QD+3" results when the block is an intra block included in a P picture. When the block is an inter block included in a P picture, "Qb=Qpp+3" results. When the block is a block included in an I picture (included in an intra picture), "Qb=Qip+3" results. With the above-described configuration and operation, in the present exemplary embodiment, the block quantization parameter can be controlled in consideration of the human visual characteristics in addition to the first exemplary embodiment. This further enables improving the human subjective image quality.

While, in the present exemplary embodiment, the block quantization parameter is corrected in consideration of the human visual characteristics, this is not restrictive. For example, this correction method may be combined with another method for correcting the quantization parameter. In other words, the present exemplary embodiment may be combined with a processing operation for controlling the quantization parameter using at least one of human body detection information, object detection information, and moving object detection information. In addition, the detection information includes recognition information on a human face or an object. Here, in the case of the quantization parameter control using the detection information and the recognition information, a quantization parameter in a detected and recognized region is made small. Furthermore, the present exemplary embodiment may be combined with a processing operation for setting a previously designated region in a picture as a significant region and making the quantization parameter in that region small.

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random access memory (RAM), a read-only memory (ROM), a storage of distributed computing systems, an optical disk (such as a compact disc (CD), digital versatile disc (DVD), or Blu-ray Disc (BD™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-069856 filed Mar. 28, 2014, which is hereby incorporated by reference herein in its entirety.

What is claimed is:

1. A coding apparatus for coding an image on a block-by-block basis, the coding apparatus comprising:
    an acquisition unit configured to acquire a coding complexity of an intra picture and a coding complexity of an inter picture, the intra picture and the inter picture having been coded previous to the image; and
    a determination unit configured to determine a quantization parameter for at least one intra block in the inter picture, the determined quantization parameter corresponding to a quantization parameter for an intra picture which is determined based on the coding complexities of the intra picture and the inter picture.

2. The coding apparatus according to claim 1, wherein the determination unit determines the quantization parameter for the intra picture based on a result of comparing the coding complexity of the intra picture with the coding complexity of the inter picture.

3. The coding apparatus according to claim 1, wherein the determination unit determines the quantization parameter for the intra picture in such a way that the quantization parameter for the intra picture obtained in a case where the coding complexity of the inter picture is higher than the coding complexity of the intra picture is larger than the quantization parameter for the intra picture obtained in a case where the coding complexity of the inter picture is lower than the coding complexity of the intra picture.

4. The coding apparatus according to claim 1, further comprising a setting unit configured to set a target code amount for the intra picture and a target code amount for the inter picture based on at least one of the coding complexities of the intra picture and the inter picture acquired by the acquisition unit,
    wherein the determination unit determines the quantization parameter for the intra picture based on the target code amount set by the setting unit.

5. The coding apparatus according to claim 1, wherein the determination unit determines that the quantization parameter for at least one intra block in the inter picture is equal to the quantization parameter for the intra picture.

6. The coding apparatus according to claim 1, further comprising a second acquisition unit configured to acquire a feature amount of the image,
    wherein the determination unit corrects the quantization parameter for the intra picture based on the feature amount acquired by the second acquisition unit.

7. The coding apparatus according to claim 6, wherein the second acquisition unit acquires the feature amount based on human visual characteristics.

8. The coding apparatus according to claim 6, wherein the second acquisition unit acquires, as the feature amount, at least one of human body detection information, object detection information, and moving object detection information.

9. The coding apparatus according to claim 6, wherein the second acquisition unit acquires, as the feature amount, a complexity of luminance and/or an average value of luminance of each block of the image.

10. The coding apparatus according to claim 1, wherein the determination unit determines the quantization parameter for at least one inter block in the inter picture, based on the determined quantization parameter and a magnitude of a quantization parameter difference which is dependent on the complexity of the intra picture and the inter picture.

11. The coding apparatus according to claim 10, wherein the determination unit determines, as the quantization parameter for the at least one intra block in the inter picture, a value obtained by subtracting the difference from the quantization parameter for an inter block in the inter picture.

12. A coding apparatus for coding an image on a block-by-block basis, the coding apparatus comprising:
an acquisition unit configured to acquire a picture type of the image; and
a determination unit configured to determine a quantization parameter, which is used to code each block targeted for coding in the image, based on a block type of the image in a case where the picture type acquired by the acquisition unit is an inter picture,
wherein the determination unit determines that the quantization parameter obtained in a case where the picture type of the image is an inter picture and a block targeted for coding in the image is an intra block, corresponds to the quantization parameter obtained in a case where the picture type of the image is an intra picture.

13. A coding method for coding an image on a block-by-block basis, the coding method comprising:
acquiring a coding complexity of an intra picture and a coding complexity of an inter picture, the intra picture and the inter picture having been coded previous to the image; and
determining a quantization parameter, which is used to code each block targeted for coding in the image, based on a picture type and a block type of the image and the acquired coding complexities of the intra picture and the inter picture,
wherein it is determined that the quantization parameter, in a case where the picture type of the image is an inter picture and a block targeted for coding in the image is an intra block, corresponds to the quantization parameter obtained in a case where the picture type of the image is an intra picture.

14. A non-transitory computer-readable storage medium storing instructions which, when executed by a computer, cause the computer to perform a coding method for coding an image on a block-by-block basis, the coding method comprising:
acquiring a coding complexity of an intra picture and a coding complexity of an inter picture, the intra picture and the inter picture having been coded previous to the image; and
determining a quantization parameter, which is used to code each block targeted for coding in the image, based on a picture type and a block type of the image and the acquired coding complexities of the intra picture and the inter picture,
wherein it is determined that the quantization parameter, in a case where the picture type of the image is an inter picture and a block targeted for coding in the image is an intra block, corresponds to the quantization parameter obtained in a case where the picture type of the image is an intra picture.

* * * * *